United States Patent
Zayeratabat

(10) Patent No.: US 7,225,585 B2
(45) Date of Patent: Jun. 5, 2007

(54) GROUND INSERTION PLANT STAKE SUPPORT AND DEEP ROOT FEEDER

(76) Inventor: Esmail Zayeratabat, 2495 Kingfield Way, San Jose, CA (US) 95124

(*) Notice: Subject to any disclaimer, the term of this patent is extended or adjusted under 35 U.S.C. 154(b) by 138 days.

(21) Appl. No.: 10/938,231

(22) Filed: Sep. 10, 2004

(65) Prior Publication Data

US 2006/0053690 A1    Mar. 16, 2006

(51) Int. Cl.
*A01G 29/00*    (2006.01)
*A01G 17/06*    (2006.01)

(52) U.S. Cl. ............................................ 47/48.5; 47/47
(58) Field of Classification Search ................. 47/48.5, 47/44, 47
See application file for complete search history.

(56) References Cited

U.S. PATENT DOCUMENTS

| | | | | |
|---|---|---|---|---|
| 349,874 A | * | 9/1886 | Buhrer | 47/48.5 |
| 790,910 A | * | 5/1905 | McClintock | 405/245 |
| 973,887 A | * | 10/1910 | Steinmetz | 405/254 |
| 1,948,117 A | * | 2/1934 | Kadow | 47/48.5 |
| 2,791,347 A | * | 5/1957 | Boehm | 165/45 |
| 3,142,935 A | * | 8/1964 | Campos | 47/48.5 |
| 3,166,869 A | * | 1/1965 | Luper | 47/47 |
| 3,345,774 A | * | 10/1967 | Delbuguet | 47/48.5 |
| 3,821,863 A | * | 7/1974 | Chan | 47/48.5 |
| 4,726,143 A | * | 2/1988 | Steinbeck | 47/48.5 |
| 4,745,706 A | * | 5/1988 | Muza et al. | 47/47 |
| 4,866,880 A | * | 9/1989 | Weinblatt | 47/79 |
| 5,335,448 A | * | 8/1994 | Martinez et al. | 47/47 |
| 5,996,279 A | | 12/1999 | Zayeratabat | |
| 6,216,387 B1 | * | 4/2001 | Stoller et al. | 47/48.5 |
| 6,299,125 B1 | | 10/2001 | Zayeratabat | |
| 6,523,302 B2 | | 2/2003 | Zayeratabat | |

* cited by examiner

*Primary Examiner*—Francis T. Palo
(74) *Attorney, Agent, or Firm*—Henry M. Stanley

(57) ABSTRACT

A plant stake support and deep root feeder sleeve contains structure that provides insertion of the sleeve into a soil volume adjacent young bushes, plants and trees without digging an adjacent hole. The sleeve is inserted directly by impact force, whereby minimum soil disturbance occurs in the plant root region. The sleeve further contains structure that provides moisture and nutrients to the plant's deep roots while serving to support a plant support stake when needed.

12 Claims, 5 Drawing Sheets

GROUND INSERTION PLANT STAKE SUPPORT AND DEEP ROOT FEEDER

FIELD OF THE INVENTION

The invention described herein relates to apparatus for supporting and deeply feeding plants, such as shrubs, flowers or trees, which have roots of a certain degree of maturity; for example, plants such as are nurtured in five-gallon containers.

BACKGROUND OF THE INVENTION

A number of plant irrigation and feeder apparatus as well as a number of plant support systems are known. U.S. Pat. No. 5,996,279, for a plant irrigation apparatus, belonging to the inventor herein, describes one such system. Water is provided to the upper portion of the assembly in the '279 disclosure through an externally connected hose. A cap closes off the upper end of the assembly to prevent entry of debris. Holes are provided in the part of the apparatus that enters the ground so that the water provided at the upper portion of the apparatus may flow downward and through the holes into the surrounding soil. A plant food basket may be provided disposed beneath the cap so that plant food placed in the basket may be carried by the flowing water through the previously mentioned holes into the soil surrounding an adjacent plant.

A tree support apparatus is disclosed in U.S. Pat. No. 6,299,125, also owned by the inventor herein. Various embodiments are disclosed for supporting immature plants and small trees to assure healthy stem and trunk growth, together with plant feeding features incorporated in the support stakes. Stabilizing structure for the support stakes is also disclosed for the support members that are associated with the plants and trees. A one piece garden support stake is disclosed in U.S. Pat. No. 6,523,302, also owned by the inventor of the apparatus described herein. The one piece stake of the '302 patent is described as having a wedge shaped lower end and a reinforced upper end that serves to receive impact blows for driving the wedged end of the stake into the ground surface adjacent plants to be supported.

SUMMARY OF THE INVENTION

A ground insertion plant stake support and deep root feeder for retaining a plant support stake within an underlying soil volume includes a tubular sleeve having a closed lower end, an open upper end and an inside diameter that is configured to accept and retain the plant support stake in substantially fixed position. A taper is formed on the closed lower end of the sleeve together with means for securing the plant support stake in the tubular sleeve. Further, means is provided for receiving impact force, wherein the latter named means is located within the tubular sleeve. Impact force is applied until the open upper end of the tubular sleeve is positioned substantially adjacent the surface of the underlying soil.

In another aspect of the invention, a ground insertion plant stake support and deep root feeder is provided for retaining a plant support stake within an underlying volume of soil having a soil surface, wherein a tubular sleeve is provided with an open upper end, a closed lower end and an inside diameter. The tubular sleeve further has a plurality of axially extending paths adjacent the inside diameter. A tapered shape is formed on the closed lower end of the sleeve having at least one hole extending through the tapered shape. The at least one hole is in communication with the plurality of axially extending paths. In addition, means is provided for driving the tapered shape into the underlying soil surface until the open upper end of the sleeve is adjacent to the surface of the soil. The tubular sleeve has a plurality of holes therein that communicate the plurality of axially extending paths with the exterior of the tubular sleeve.

In yet another aspect of the invention, a ground insertion plant stake support for retaining a plant support stake and for deep root feeding of a plant within an underlying soil volume having a soil surface is provided that includes a tubular support and feeding sleeve having a tube wall, an open upper end, a closed lower end and a plurality of axially extending feeder paths along the tube wall. The tube wall further has a plurality of holes therethrough that communicate the plurality of feeder paths with the exterior of the tubular support. A diminishing cross section member is attached to and extends from the closed lower end of the tubular support, having at least one passage therethrough that communicates the plurality of feeder paths with the exterior of the diminishing cross section member. Means is provided for driving the tube wall into the underlying soil surface to a position where the open upper end of the tube is substantially adjacent to the soil surface.

Figures 3A, 3B:
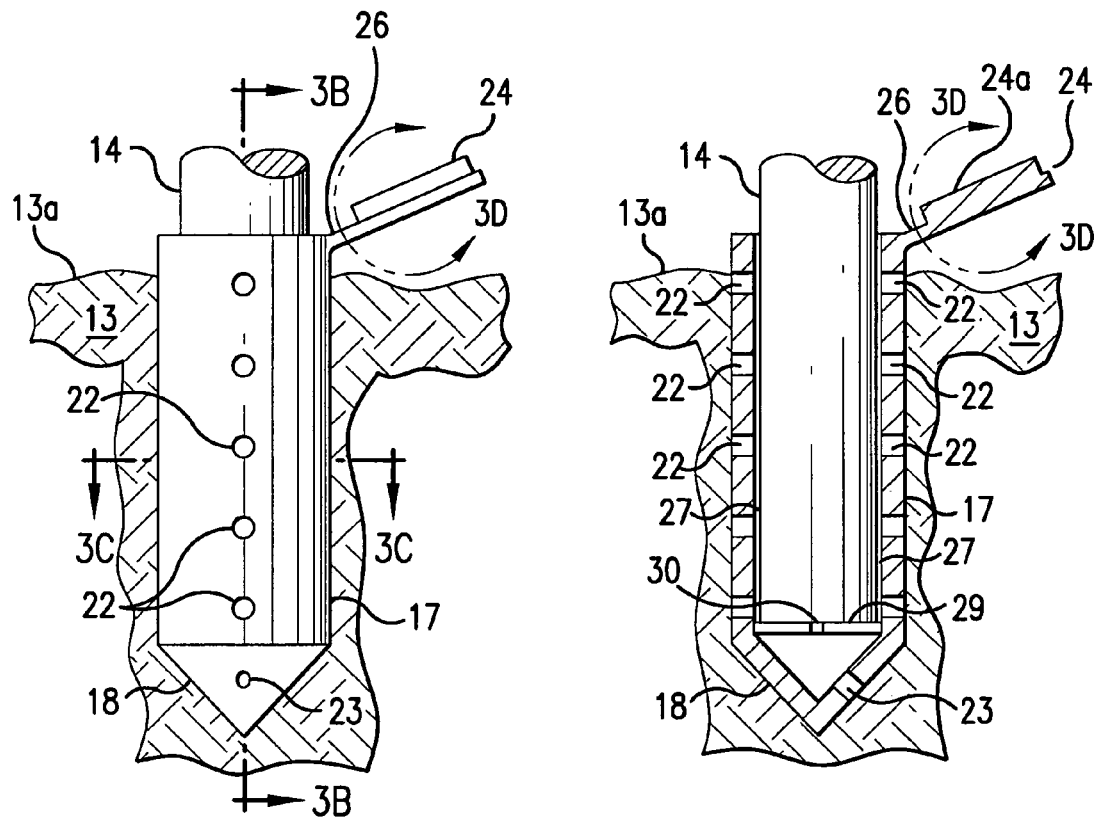
FIG. 3A is an elevation of an alternate embodiment of the present invention within a volume of soil.
FIG. 3B is a section along the line 3B—3B of FIG. 3A.

Detail 3D in FIG. 3A is shown rotated through 90° C. in the section of FIG. 3B.

Figure 4:
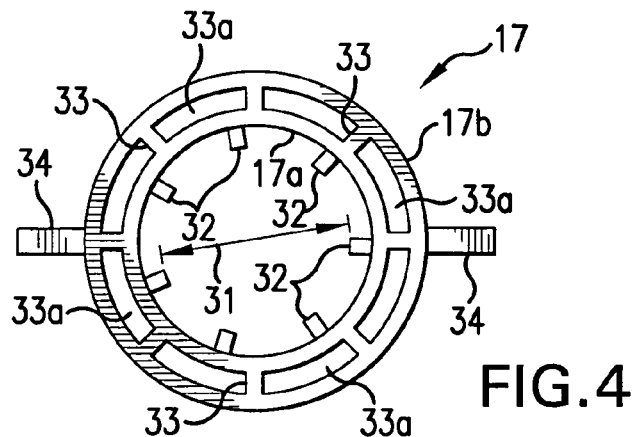

FIG. 4 is a plan view of one of the embodiments of the plant stake support and deep root feeder of the present invention.

Figure 5A:
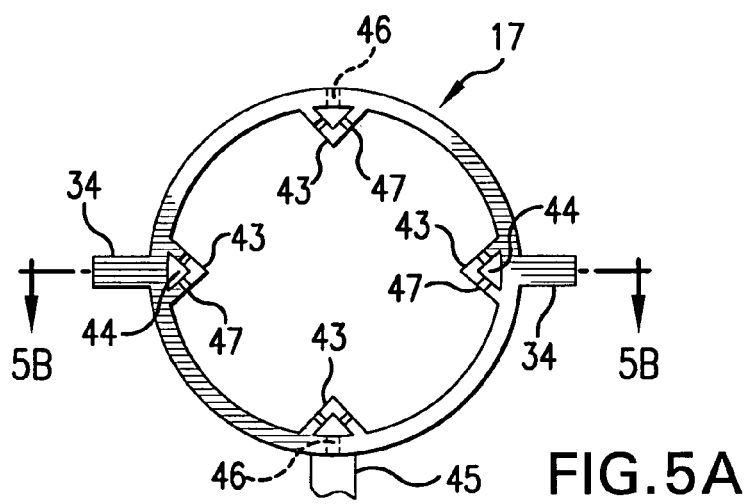

FIG. 5A is a plan view of another embodiment of the plant stake support and deep root feeder of the present invention.

Figure 5B:
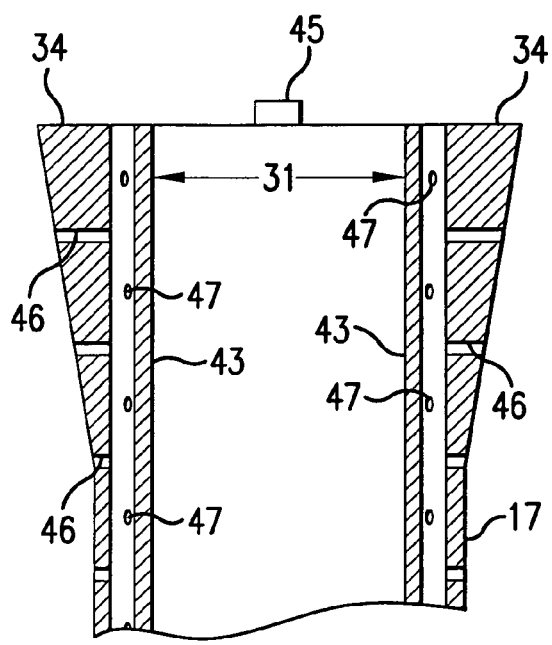

FIG. 5B is a section along the line 5B—5B of FIG. 5A.

Figure 6A:
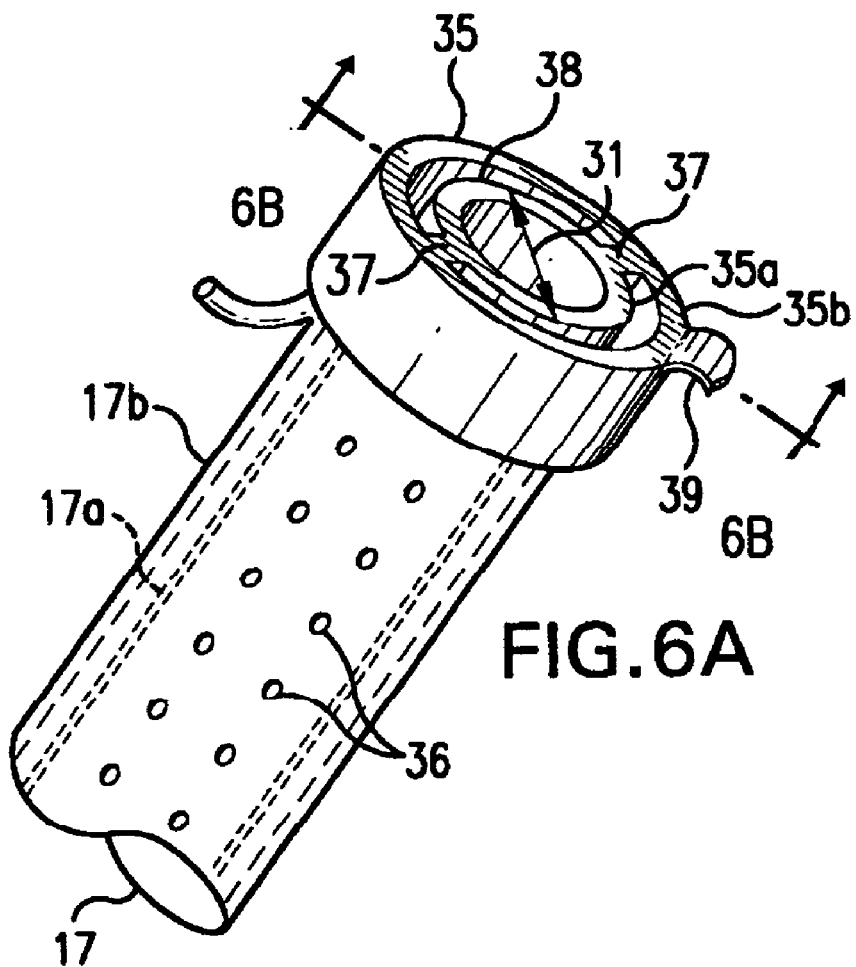

FIG. 6A is a partial perspective of yet another embodiment of the present invention.

Figure 6B:
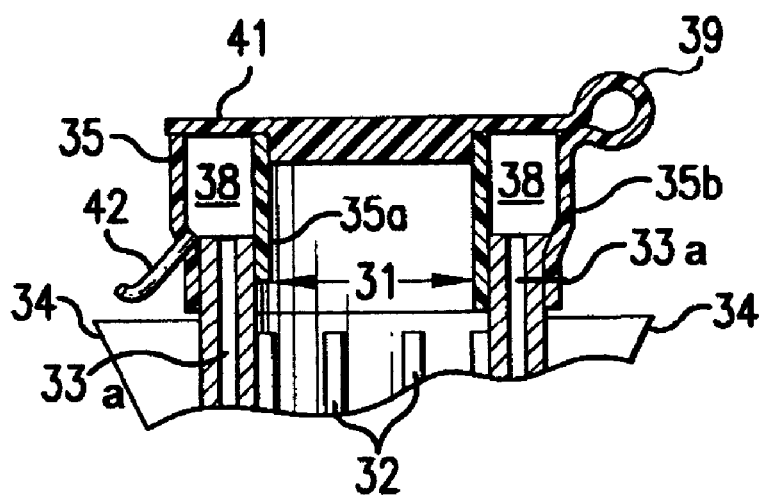

FIG. 6B is a section taken along the line 6B—6B of FIG. 6A.

Figure 7:
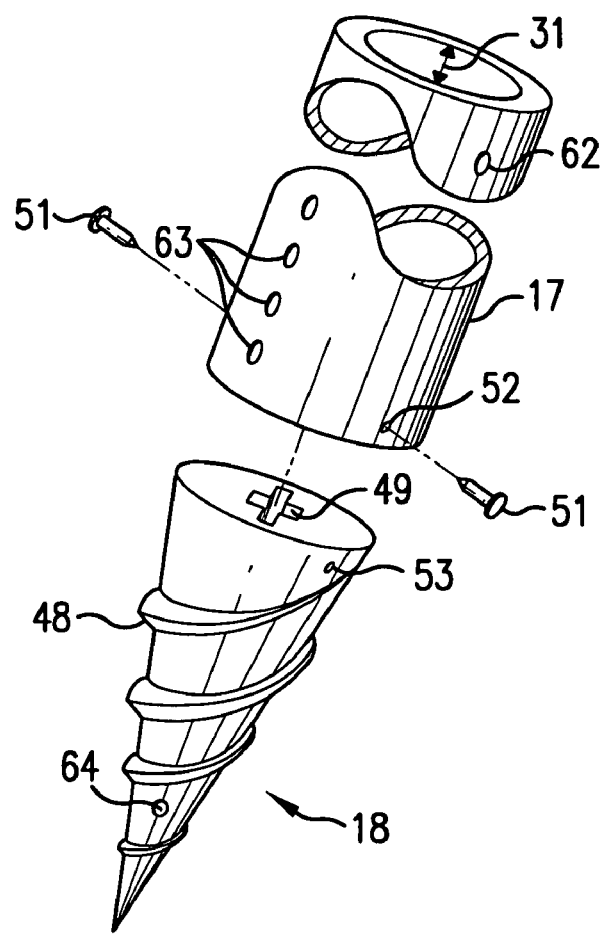

FIG. 7 is a partial exploded view of an additional embodiment of the present invention.

Figure 8:
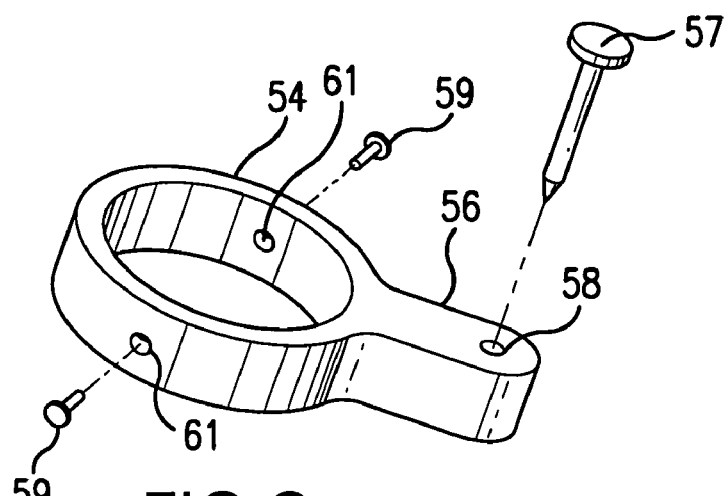

FIG. 8 is a perspective of a collar for use with the embodiment of FIG. 7.

DESCRIPTION OF THE PREFERRED EMBODIMENTS

Figure 1:
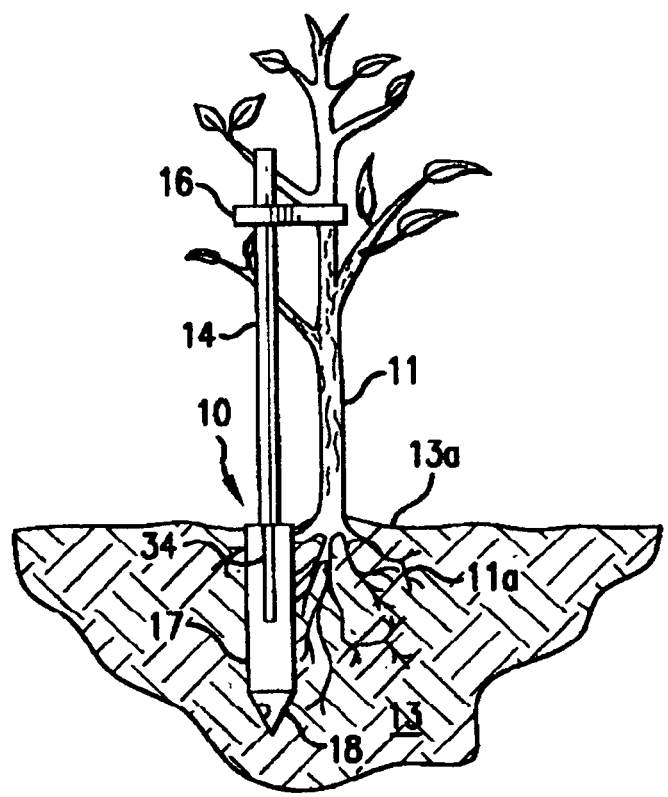
FIG. 1 shows a plant in underlying soil supported by a stake in conjunction with the ground insertion plant stake support and deep root feeder of the present invention.

Young plants and trees that reach a relatively young state of maturity often need support to attain optimum growth. FIG. 1 of the drawings depicts a stake support and deep root feeder 10 in an environment including a relatively young plant 11, such as may be grown in a volume of soil 13 having an upper surface 13a. The support and deep root feeder 10 may be used to support a plant support stake 14 having a tie 16 at the upper end thereof that contacts and supports the young growing plant 11. The ground insertion plant stake support and deep root feeder is seen inserted into the volume of soil 13 until the upper end thereof is approximately at the same level as the soil surface 13a. The young plant 11 has a root system 11a within the volume of soil 13. The ground insertion device of this invention is positioned to serve the plant 11 as both a support for the support stake 14 and as a deep root feeder for the root system 11a.

Figures 2A, 2B:
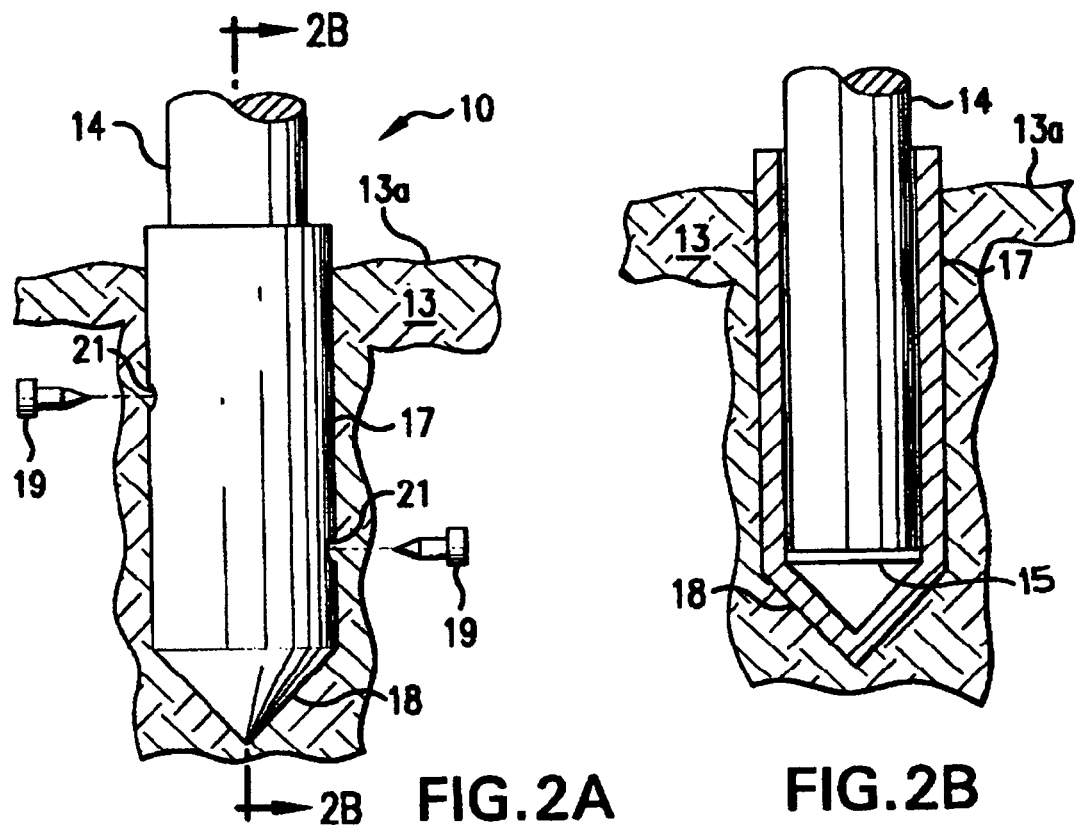
FIG. 2A shows a basic embodiment of the present invention supporting a plant support stake.
FIG. 2B is a section along the line 2B—2B of FIG. 2A.

In FIG. 2A, the device 10 is shown having a tubular member 17 inserted within the volume of soil 13 to a point where the upper end of the tubular member 17 is almost even with the surface of the soil volume 13a. The lower end of the tubular member 17 is closed, as depicted in FIG. 2A, and has a lower diminishing cross section member 18 attached to and extending from the closed lower end. The resulting pointed lower end formed by the member 18 on the tubular member 17 facilitates entry of the plant stake support 10 into the soil volume 13. In the embodiment of FIG. 2A, the plant support stake 14 may be a wooden pole that is held within the tubular body 17 by means of a pair of fasteners 19 inserted through holes 21 formed in the tubular wall.

As seen in FIG. 2B, the wall of the tubular member 17 is of substantial thickness and may be made of an appropriate material, such as a reasonably strong plastic or a plastic coated metal member. A material is used to fabricate the device 10 that is corrosion resistant. The relatively thick wall on tubular member 17 diminishes in cross section at the lower end to form the lower member 18. Thus, the lower member appears as a pointed member or wedge. The plant support stake 14 is stopped by the convergence of the walls of the tubular member and the lower member 18 attached to the bottom of the tubular member 17. An anvil member 15 is positioned at the convergence of the walls. As a result, the plant support stake 14 (or some other member having an appropriate shape on the lower end), may be used to impart impact blows to the lower portion of the tubular member 17, either by the inertia of downward motion imparted to the support stake 14 or by means of delivering impact blows to an upper accessible end of the support stake. In this fashion, the ground insertion plant stake support 10 is driven into the volume of soil 13 until the upper end of the tubular portion 17 is approximately at the soil surface 13a, as hereinbefore described.

The embodiment of the invention depicted in FIG. 3A shows a plant support stake 14 within the inside diameter of the tubular member 17. A series of holes 22 are formed through the wall of the tubular member dispersed between an open upper end of the tubular member and the closed lower end to which the diminishing cross section member 18 is attached. FIG. 3A also shows a hole 23 through the wall of the lower member 18. A cap 24 is shown on a hinge member 26 that may take the form of a thin flexible plastic member. The hinge member attaches the cap to the upper end of the tubular member 17. The section of FIG. 3B shows the plant support stake 14 placed inside the tubular member 17. Spaces 27 are created between the surface of the plant support stake 14 and the inner wall surface of the member 17 by a series of lands 28 (FIG. 3C) extending axially along the inside diameter of the member 17. The spaces 27 are formed by the lands 28 as they provide displacement of the inside diameter of the tubular member from the outside diameter of the stake 14. This displacement creates the paths or passages 27 for the flow of moisture that enters the interior of the member 17 through the holes 22. The moisture is then provided a continuous flow path through a hole 30 in a "washer-like" member 29 fixed within the tubular member 17 adjacent to the diminishing cross section member 18. Moisture is further allowed to flow outwardly to the exterior of the lower member 18 through the hole 23 therein. In this fashion, moisture gathered from the top of member 17 and/or through the holes 22 from the surrounding soil is delivered to the lower reaches of the device 10 to be discharged therefrom in the immediate area of the deep roots of any adjacent plant. The "washer-like" member 29 lodged in the lower portion of the tubular member 17 serves as an impact absorbing member in the embodiment of FIGS. 3A, B and C, so that impact force delivered to the impact absorbing member as described hereinbefore serves to insert the device 10 within the soil volume 13 until the upper end of the tubular member 17 is approximately at the level 13a of the soil surface.

Figure 3C:
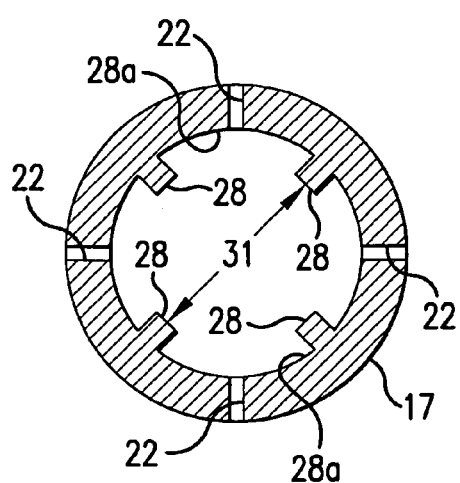
FIG. 3C is a section along the line 3C—3C of FIG. 3A.

The cap 24 is shown in FIG. 3B rotated through 90° in the section view, to show that it has a land 24a thereon. The cap is configured to fit within the inside diameter (indicated at 31 in FIG. 3C), as it is swung to a closed position around hinge member 26 when the plant support stake 14 is withdrawn from the inside diameter of the member 17. FIG. 3C clearly depicts the manner in which the holes 22 extend through the wall of the tubular member 17 communicating the outside of the tubular member with the inner diameter 31 thereof through the wall of the tubular member to form the axially extending paths 27 within the tubular member. It should be noted that the inside diameter of the tubular member 17 is formed so that an alternating array of lands 28 and grooves 28a extend axially therealong.

With reference now to FIG. 4 of the drawings, the inside diameter 31 of the tubular member 17 is shown extending between the innermost points on a plurality of lands 32 on the inside surface of the tubular member. The plan depiction of the tubular member 17 further shows a hollow wall in the tubular member having a number of connecting members 33 between the inner wall 17a and the outer wall 17b and forming a plurality of axially extending paths 33a through the double wall of the tubular member. A pair of opposing somewhat triangular flanges 34 (best seen in FIG. 5B) extend from the exterior surface of the tubular member 17. The tops of the flanges 34 are positioned at or near the top of the tubular member 17, depending on the positioning of a cap 35 to be described in conjunction with FIGS. 6A and 6B.

In FIG. 6A, a perspective of the embodiment of FIG. 4 shows the tubular member having a plurality of holes 36 extending through the double wall to communicate the exterior of the tubular member with the axially extending paths 33a as well as with the inside diameter 31 of the embodiment of FIG. 4. The exterior wall 17b and the interior wall 17a (shown in phantom lines) are shown in FIG. 6A wherein the cap 35 is positioned on top of the tubular member 17. The cap 35 also has an inner wall 35a and an outer wall 35b. The inner and outer walls are joined by a support member 37 extending therebetween so that a space 38 exists between the inner and outer walls. The space is better seen in FIG. 6B as a circumferential chamber extending around the cap 35 between the inner and outer walls thereof. A flexible hinge 39 extends from the periphery of the cap 35 to join a cover 41 thereto.

The cap 35 is disposed for positioning between an open position away from the opening in the top of the cap to a closed position illustrated in FIG. 6B. The cap 35 is configured so that the outer diameter of the inner wall 35a contacts the inside surface of the inner wall 17a in the member 17 and the inside surface of the outer wall 35b of the cap 35 contacts the outer surface of the wall 17b of the member 17, as is best seen with reference to FIG. 6B. The chamber 38 in the cap 35 is in communication with the axially extending paths or passages 33a extending through the tubular sleeve 17. An inlet 42 extends from the outside of the cap 35 to communicate with the space or chamber 38 for providing moisture to the chamber that may subsequently flow through the paths 33a toward the lower end of the tubular sleeve to exit in the region of the lower roots of an adjacent plant through hole 23 (FIGS. 3A and 3B) in the diminishing cross section member 18. Thus, when the cover 41 is open on the cap 35, a plant support stake is insertable through the upper opening therein into the interior of the tubular sleeve. The stake 14 is spaced from the inside diameter of the inner wall 17a by the lands 32 formed thereon. Flanges 34 extend from the opposing sides of the tubular sleeve 17 and serve to prevent axial rotation of the tubular sleeve after it has been inserted into an underlying volume of soil 13 as described hereinbefore.

An alternative embodiment of the invention is seen in plan view in FIG. 5A. The flanges 34 are present as in the embodiment of FIG. 4. A plurality of inwardly extending lands 43 are seen in FIG. 5A as somewhat triangular in cross section. The lands have enclosed paths or passages 44 running axially relative to the tubular sleeve 17. An additional plurality of holes 46 extend from the exterior of the tubular sleeve 17 into the passages 44 of FIG. 5A. Another plurality of holes 47 extend through the wall of the lands 43 to communicate with the inside of the tubular member or sleeve 17. As a consequence, moisture contained within the volume of soil 13 surrounding the tubular sleeve may enter through the holes 46 into the passages 44, and as well from the passages 44 through the holes 47 into the interior of the tubular sleeve. Moisture introduced into the passages 44 and the interior of the tubular sleeve 17 consequently flows downwardly when the tubular sleeve is positioned as previously described in the volume of soil 13 to exit hole 23 in the diminishing cross section member 18 at the bottom of the sleeve. The moisture thus enters the soil in the region of the deeper roots of a plant to which the sleeve is adjacent. A cap, similar to the cap 24 in FIGS. 3A and 3B is attached by a flexible member 45 to the tubular sleeve in the embodiment of FIGS. 5A and 5B so that the opening in the upper end of the sleeve may be closed to prevent the entry of debris when a plant support stake 14 is absent. FIG. 5B is presented to show more clearly the manner in which holes in the wall of the tubular sleeve and the lands 43 allow moisture external of the sleeve to enter the passages 44 as well as the interior of the sleeve as described hereinbefore. The opposing flanges 34 extending from the exterior of the sleeve 17 are for the purpose of preventing axial rotation of the sleeve 17 once it is inserted within the volume of soil as described hereinbefore.

Turning now to the exploded depiction of the invention shown in FIG. 7, the tubular sleeve 17 is shown in its most rudimentary form, having the aforementioned inside diameter 31 (in the open upper end thereof). The lower end of the tubular sleeve is closed by the diminishing cross section member 18. The member 18 has external threads 48 thereon, as seen in FIG. 7. The diminishing cross section member 18 is shown in FIG. 7 detached from the lower end of the tubular sleeve 17 so that a cross-shaped depression 49 is visible in the upper end of the lower member 18. The cross-shaped depression is for the purpose of receiving the cross shaped end of a tool or a plant support stake such as that shown in the drawings of U.S. Pat. No. 6,523,302. As a result when the tubular sleeve 17 is assembled to the lower member 18 by appropriate means, such as the fasteners 51 that pass through mating holes 52 and 53 in the sleeve and lower member respectively, the assembly of the tubular sleeve and the lower member may be advanced into the underlying volume of soil 13 by rotation of the assembly to advance the threads 48 into the soil. Alternatively, the assembly of FIG. 7 may be embedded in the volume of soil by fixing a collar 54 (seen in FIG. 8) at the open upper end of the tubular sleeve 17 and rotating the handle 56 attached to the collar in a direction to advance the threads 48 into the volume of soil. In this fashion, the ground insertion plant support and deep root feeder assembly of FIG. 7 is inserted into the volume of soil until the upper end of the tubular sleeve 17 is approximately adjacent the soil surface 13a. Once achieving this relative position with the soil surface, the tubular sleeve is prevented from rotating further by insertion of a pin 57 through a hole 58 in the handle 56. When the pin is entered into the underlying soil surface, the plant support and deep root feeder is stabilized rotationally in the soil volume. The collar 54 is fixed rotationally to the tubular sleeve 17 by appropriate means such as pins 59, shown in FIG. 8 passing through holes 61 in the collar for entry into a hole or holes 62 in the upper end of the wall of the tubular sleeve 17. As recited for the previous embodiments of the invention described in this disclosure, holes 63 are formed through the wall of the sleeve 17 to provide passage of moisture through the wall of the sleeve for purposes hereinbefore described. Moisture may then flow into the interior of the sleeve toward the cross shaped depression 49 and onward toward the exterior of the diminishing cross section member at the lower end of the sleeve through a hole 64 therein. It should also be noted that the top surface of the lower member 18 seen in FIG. 7 serves as an anvil member to receive impact force delivered thereto as described hereinbefore in the event such force is necessary to insert the sleeve 17 sufficiently deep into the soil volume. Note that the lower end 18 in the disclosed embodiments may have a wedge or conical shape sharper than that shown in the figures to facilitate entry into the underlying soil volume of the ground insertion plant stake support and deep root feeder due to impact force.

Although the best mode contemplated for carrying out the present invention has been shown and described herein, it will be understood that modification and variation may be made without departing from what is regarded to be the subject matter of the invention.

What is claimed:

1. A ground insertion plant stake support and deep root feeder for retaining a plant support stake within an underlying soil volume having a soil surface, comprising a tubular sleeve having an open upper end, a lower end and an inside diameter, said tubular sleeve having a plurality of axially extending paths adjacent said inside diameter, a tapered shape extending from said lower end and having at least one hole extending therethrough in fluid communication with said plurality of axially extending paths, and anvil means within said tubular sleeve for receiving impact force for driving said tapered shape into the underlying soil volume until said open upper end is adjacent to the soil surface, said tubular sleeve further having a plurality of holes therein communicating fluid between said plurality of axially extending paths with the exterior of said tubular sleeve.

2. A ground insertion plant stake support as in claim 1, comprising a cap disposed to cover said open upper end when a plant support stake is removed from the support.

3. A ground insertion plant stake support as in claim 2, wherein said cap has a circumferential chamber therein, said circumferential chamber being in communication with said plurality of axially extending paths, and
   having means for introducing moisture into said chamber.

4. A ground insertion plant stake support as in claim 3, wherein said plurality of axially extending paths comprises,
   a double walled tubular construction having vertical lands therebetween the walls for forming said paths.

5. A ground insertion plant stake support as in claim 1, wherein said plurality of axially extending paths comprises,
   a plurality of grooves in said tubular sleeve inside diameter.

6. A ground insertion plant stake support as in claim 1, wherein said plurality of axially extending paths comprises,
   a plurality of circumferentially spaced lands on said tubular sleeve inside diameter.

7. A ground insertion plant stake support as in claim 6, wherein said plurality of lands enclose ones of said plurality of axially extending paths.

8. A ground insertion plant stake support as in claim 1, comprising
   at least one external flange attached to said tubular sleeve to stabilize said tubular sleeve rotationally in said underlying soil volume.

9. A ground insertion plant stake support as in claim 1 comprising
   a collar attached to said tubular sleeve open upper end, and
   means on said collar for preventing axial rotation of said tubular sleeve when said open upper end is adjacent the underlying soil surface.

10. A ground insertion plant stake support for retaining a plant support stake and for deep root feeding a plant within an underlying soil volume having a soil surface, comprising
    a tubular support and feeding sleeve having a tube wall, an open upper end, a lower end, and a plurality of axially extending feeder paths along an inner surface of said tube wall,
    said tube wall further having a plurality of holes in fluid communication with said plurality of feeder paths and the exterior of said tubular support,
    a diminishing cross section member attached to and extending from said lower end and having at least one passage therethrough communicating fluid between said plurality of feeder paths and the exterior of said diminishing cross section member, and
    anvil means within said tube wall for receiving impact force for driving said tube wall into the underlying soil volume until said open upper end is substantially adjacent to the soil surface.

11. A ground insertion plant stake support as in claim 10, further comprising
    a cap having a circumferential chamber in communication with said plurality of axially extending feeder paths, and
    means for introducing moisture into said chamber.

12. A ground insertion plant stake support as in claim 10, comprising
    means for preventing rotation of said tubular support when said open upper end is substantially adjacent to the soil surface.

* * * * *